United States Patent

Hutchinson et al.

[15] 3,642,402
[45] Feb. 15, 1972

[54] INJECTION MOLDING PROCESS CONTROL

[72] Inventors: Herman R. Hutchinson, Wyncote; Vasken F. Arpajian, Huntingdon Valley; Robert S. Malcomson, Lansdale, all of Pa.

[73] Assignee: Pennwalt Corporation

[22] Filed: Mar. 10, 1970

[21] Appl. No.: 18,142

[52] U.S. Cl. .............................. 425/144, 264/328, 425/242, 425/256
[51] Int. Cl. .......................................................... B29f 1/06
[58] Field of Search .......... 18/30 CM, 30 CR, 30 CV, 30 CS, 18/2 HA, 30 CK, 30 CS, 12 ST, 17 C, 13 C

[56] References Cited

UNITED STATES PATENTS

| | | |
|---|---|---|
| 3,492,700 | 2/1970 | Kornmayer ........................ 18/2 HA X |
| 3,283,041 | 11/1966 | Sommerfeld .................... 18/2 HA UX |
| 3,551,943 | 1/1971 | Staton et al. .......................... 18/2 HA |
| 3,292,208 | 12/1966 | Wood .................................... 18/2 HA |

*Primary Examiner*—J. Spencer Overholser
*Assistant Examiner*—Norman E. Lehrer
*Attorney*—Carl A. Hechmer, Jr. and Stanley Bilker

[57] ABSTRACT

Process control for an injection molding machine measures the viscosity characteristics of the plasticized material by monitoring pressure in the melt stream being injected at a predetermined position of the forward stroke of the ram during flow of the material into the mold. If the pressure-viscosity exceeds or falls below the previously determined band limits set, the heat input to subsequent shots being prepared is respectively raised or lowered by (1) increasing or decreasing barrel temperature, (2) increasing or decreasing speed of screw rotation, or (3) increasing or decreasing back pressure on the screw during rotation thereof.

21 Claims, 10 Drawing Figures

INJECTION MOLDING PROCESS CONTROL

This invention relates to injection molding machines, and more particularly relates to a method and apparatus for controlling the operation of such injection molding machines in order to produce consistently uniform parts, especially when dimensions or cycle conditions are critical.

In the well known process of injection molding, a hydraulically operated ram consisting of a rotatable-reciprocable screw moves within a heated barrel to inject a mass of plastic material, known as a shot, through an orifice into a mold cavity. The material is plasticized by a combination of heat within the extrusion barrel, rotation of the screw, and degree of back pressure on the screw during generation of the next shot. In recent years, it has become desirable to automate many machine operations, for example by computerized numerical control. However, control programs for indicating and establishing cycle functions for injection molding machines are not only expensive but also such programs have failed to consider molding material batch variations, variations in environmental temperature and humidity and mold temperature changes. While prior process control systems have considered the variables of injection rate, injection pressure and melt temperatures and automatically compensated for deviations in temperature-pressure-position coordinates, these earlier systems relied on peak pressure measurements or absolute position parameters with compensation afforded through correction of injection hydraulic pressure.

The present invention is primarily concerned with the viscosity of the melt stream prior to attainment of full ram pressure as a barometer of the molding cycle. That is, variations in melt viscosity result from (1) variations in molding material composition from batch to batch, (2) percentage of regrind material in the feed, (3) variations in barrel and mold temperatures, (4) variations in ambient temperature and environmental humidity, and (5) fluctuations in mold temperature. The foregoing variables are the principal ones which especially plague the operator of molding equipment when cycle conditions or part quality are extremely critical. By monitoring the pressure of the melt stream at a specific predetermined portion of the molding cycle while the mold cavities are only partially filled, the pressure measurement is a function of the relative viscosity of the plastic composition at such time. This pressure measurement will be hereinafter referred to as the "control" pressure. This pressure measurement is taken at the same precise position during the forward stroke of the screw prior to attainment of full ram pressure. If the forward speed of the screw is controlled within relatively small limits, for example, by a temperature and pressure compensated flow control valve, "control" pressure is obtained at the same relative position of the screw on successive shots. In the event that the forward speed of the ram falls outside these predetermined limits, such deviation is called to the operator's attention by a suitable alarm for appropriate repair or correction.

The actual viscosity-pressure measurement may be taken at any time between 50 to 80 percent cavity fill for example, so long as the precise interval is the same from cycle to cycle. The pressure is monitored at any point in the melt stream from an area in the barrel in advance of the screw to a position in the mold cavity itself. The pressure band for producing satisfactory molded parts is determined by the operator during set up of the equipment for producing such parts. Thereafter, if the pressure falls outside the band, appropriate adjustment is made to change the plasticity of the melt stream, for example, depending upon whether the monitored pressure-viscosity level is above or below the prescribed limits, the heat input to the melt is respectively increased or decreased by (1) raising or lowering the barrel temperature, (2) increasing or decreasing the speed of screw rotation, or (3) increasing or decreasing the back pressure on the screw during generation of the next shot. The foregoing process control system and method is fully applicable to injection molding of thermoplastic material, and, within certain limits, to thermoset material. Also within the contemplation of the instant invention utilizing the pressure-viscosity principles heretofore mentioned, is the acceleration or retardation of forward ram speed in response to a lowered or elevated pressure level.

It is therefore an object of this invention to provide a method and apparatus for the process control of an injection molding cycle.

Another object of this invention is to provide a method and apparatus for injection molding process control of both thermoplastic and thermosetting material where cycle and/or part quality are critical.

Still another object of this invention is to provide an injection molding apparatus which will automatically compensate for batch-to-batch variations in molding material, variations in percentage regrind in the feed, variations in ambient temperature and environmental humidity conditions, and fluctuations in mold temperature.

Yet another object of this invention is to provide a process control system for an injection molding apparatus which monitors the pressure of the melt stream at a precise predetermined portion of the injection stroke as a barometer of the viscosity of the shot being injected.

Yet still another object of this invention is to provide an injection molding process control in which cycle-to-cycle viscosity of the shots being injected is maintained substantially uniform by the degree of heat input to the composition being plasticized.

A further object of this invention is to provide an injection molding process control in which an alarm is signaled when the system is not compensated after a predetermined amount of heat is added or removed to the composition being plasticized.

Still another object of this invention is to provide an injection molding process control which signals an alarm when the forward stroke of the ram is faster or slower than predetermined prescribed limits.

Yet a further object of this invention is to provide an injection molding process control for thermosetting material which will apprise the operator of the portion of the "control" pressure-temperature curve within which he is operating.

Other objects of this invention are to provide an improved device and method of the character described which is easily and economically produced, sturdy in construction, and highly efficient and effective in operation.

With the above and related objects in view, this invention consists of the details of construction and combination of parts as will be more fully understood from the following detailed description when read in conjunction with the accompanying drawings in which:

FIG. 3 is an electrical schematic diagram of the solid state control circuit embodying this invention, FIG. 3A illustrating the control switches, sample counter and inhibit circuitry, FIG. 3B illustrating the "add heat" circuitry, and FIG. 3C illustrating the "remove heat" circuitry.

Referring now in greater detail to the drawings in which similar reference characters refer to similar parts, there is shown an injection molding machine whose operation is regulated by a process control system embodying this invention. As each shot is injected into the mold, the viscosity characteristics of the plasticized material in the melt stream is monitored at a predetermined position of the forward stroke of the ram during flow of the material into the mold. During set up for molding a particular part, the pressman determines in the usual manner the optimum temperature of operation of the barrel, shot volume, and ram pressure, timer settings and screw speed, etc. in order to produce an acceptable molded article. Next, the operator establishes within narrow limits the range of pressure, as a function of viscosity of the plastic material, within which precision tolerance parts can be molded. Thereafter, should the viscosity as measured by the monitored pressure at an exact early point in time of the injection stroke fall outside the band, heat is added to or subtracted from subsequent shots being prepared until the viscosity characteristics of the melt stream again come within the prescribed range. In the present illustration, the barrel temperature is raised or lowered in set increments depending upon whether the material's viscosity has exceeded or dropped below the band pressure limit. However, it is to be understood that compensation for viscosity aberrations may be accommodated by varying the degree of plasticizing action of the screw, as by varying the back pressure on the screw or by varying screw rotational speed. In addition, it is contemplated that variations in pressure occurring within the mold itself can be corrected by inversely varying the viscosity as mentioned above. Still another concept related to the foregoing system is to monitor the forward speed of the ram and with variations from a predetermined speed as a result of changes in viscosity, respectively decreasing and increasing the melt temperature to compensate for faster or slower than prescribed speeds.

Figure 1:
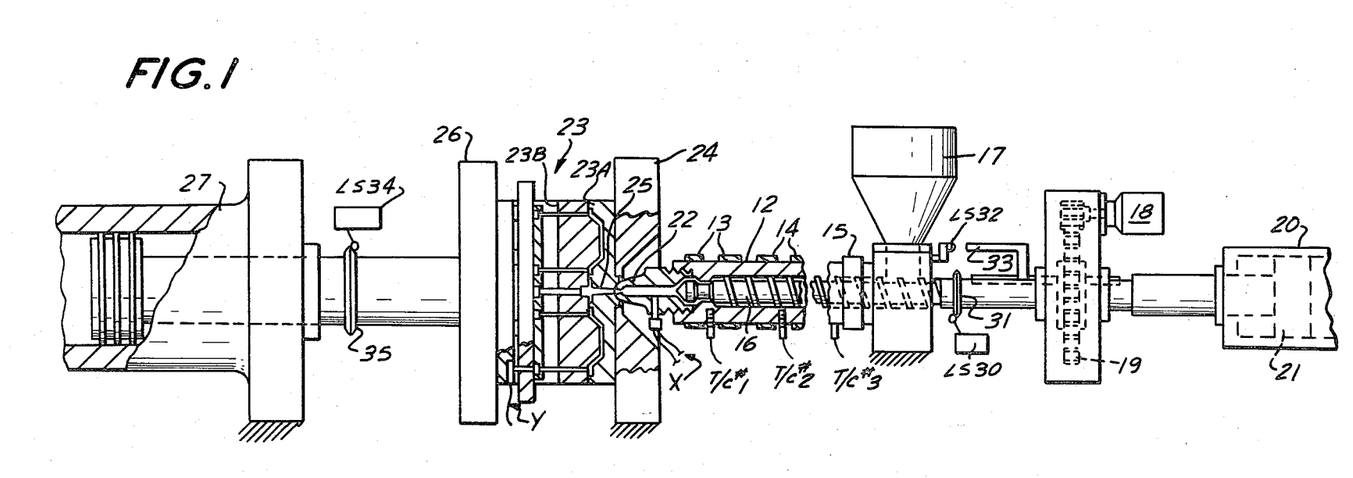
FIG. 1 is a side elevational view and partly in section of an injection molding machine embodying the process control invention.

Referring now to FIG. 1, the injection molding machine is generally conventional and includes an extrusion barrel 12 which is heated by a plurality of electrical elements arranged in a forward zone 13, a medial zone 14 and a rear zone 15. A screw 16 is axially supported within the barrel 12 and is rotatable and longitudinally reciprocable therein. Plastic material is fed into the barrel 12 from a hopper 17. Rotary motion for the screw 16 acts to plasticize the material and is accomplished through a motor drive 18 and suitable gearing 19. A hydraulic cylinder 20 and piston 21 through suitable oil lines (not shown) reciprocates the screw 16 for injection of the prepared shot through nozzle 22 into the mold 23. As illustrated, the right-hand portion 23A of the mold is mounted upon a stationary platen 24 and includes a sprue 25 which channels the plastic from the nozzle orifice into the mold cavity. The left hand portion 23B of the mold is affixed upon a moving platen 26 which is horizontally reciprocable and adapted to close the mold half 23B by means of clamping cylinder 27.

A pressure transducer probe X is mounted in the nozzle 22 of the barrel 12 and is adapted to measure pressure of the melt stream up to approximately 20,000 pounds per square inch by translating the applied pressure into electrical signals proportional to such pressure. A suitable probe for this purpose is Dynisco Model PT 420A in which a pressure capillary tube inserted within the melt stream develops an electrical signal output across a strain gauge bridge, which electrical signals are directly proportional to the melt pressure registered by the capillary. A load cell Y for monitoring the mold cavity pressure may be incorporated in the mold half 23B, the pressure also being translated by a strain gauge transducer into electrical signals. The information from either the melt transducer X or the mold load cell Y is fed into controller Z for manually or automatically regulating the temperature of the barrel 12.

The sampling of the melt pressure (or the mold cavity pressure) is made at a precise early moment during the forward stroke of the ram 16 prior to the development of full pressure. A limit switch LS30 is actuated when tripped by trigger 31 mounted on the shank of the ram. As will be evident later, an injection forward limit switch LS32 is closed by tripper 33 when the ram 16 arrives at its maximum full forward position. The injection forward limit switch LS32 serves to start a sampling count to insure that a predetermined number of injection shots will have occurred after a correction has been made. In addition, a limit switch LS34 adjacent the clamping cylinder and actuated by tripper 35 opens when the mold starts to close.

Figure 3A:
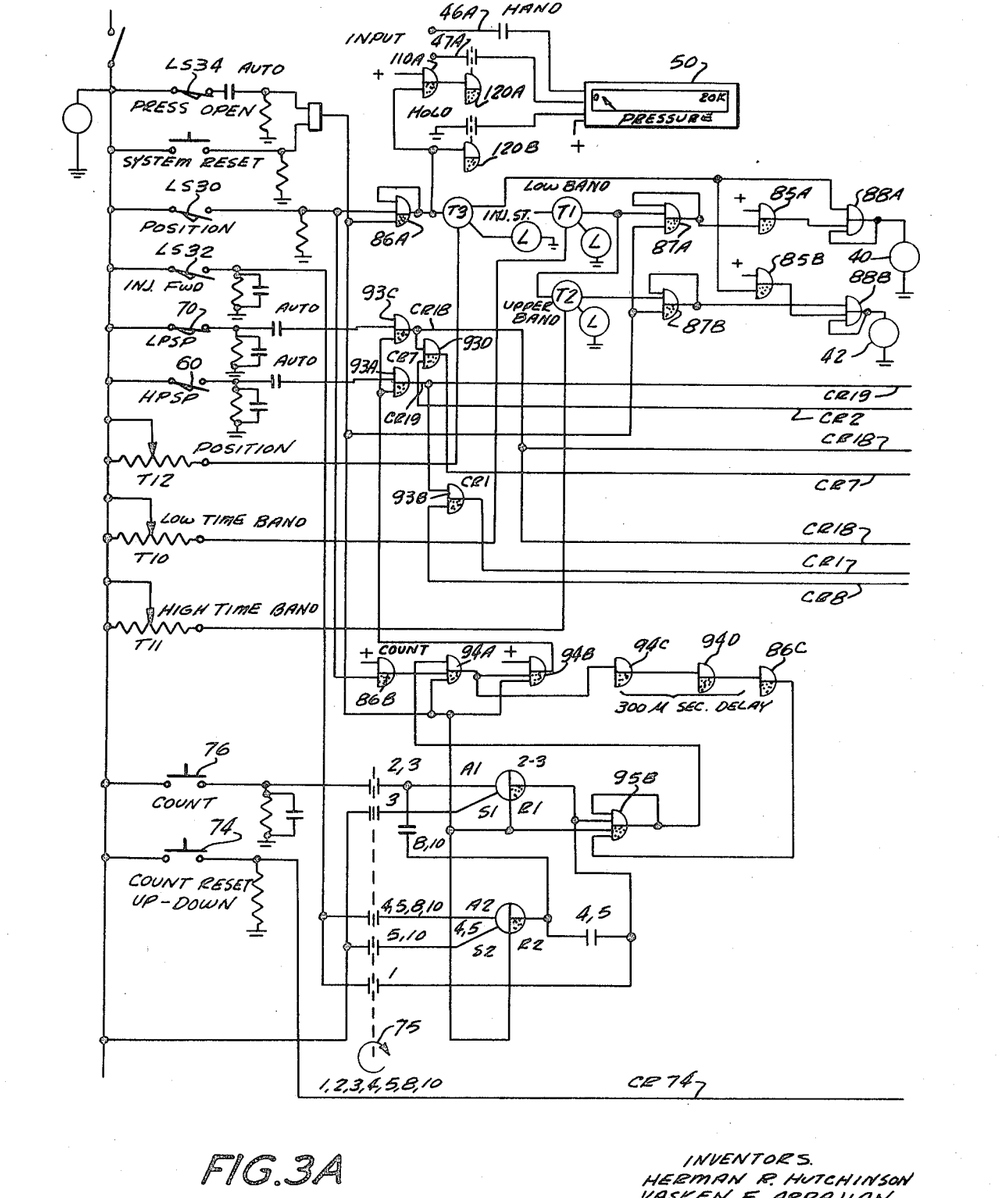

In order to determine whether the ram forward speed is within certain defined limits, a timing circuit is incorporated to indicate whether the ram speed is within limits, and if not, whether the speed is too fast or too slow. Referring now to FIG. 3A, a timer T1 actuated each time the ram initiates its forward motion (injection start) is set for the low end of the band at which the ram 16 should reach the pressure sampling position—i.e., at position of the limit switch LS30. A timer T2 is incorporated across the output of timer T1 and is set to time out at the top end of the band. Both timer T1 and T2 are millisecond timers and as incorporated in the circuit have internal contacts which close only when their respective times run out and, as shown, emit an output at such time. For example, T1 is set at 1.49 seconds and T2 is set at 0.02 second. Next a position timer T3 is set at 0.50 second after the ram 16 reaches the limit switch LS30, the latter nominally being actuated exactly one second after the injection start occurs. In effect, timer T3 is adapted to change or adjust the position of LS30 without changing the physical position thereof or the position of its trigger 31.

As will be apparent hereinafter, the control circuit consists of a plurality of a solid state logic modules in which a plurality of electronic gates designated by the symbol  are incorporated in sets of four, known as "quads." If an input signal is applied to the upper or white portion, there may be an output signal. However, if an input signal is applied to the lower or black portion, the output is zero because of the "inhibit." Thus, there is an output only if there is an input to the upper white portion and not an input to the lower black portion.

If LS30 closes at exactly one second after the ram has started forward neither the "too fast" lamp 40 nor the "too slow" lamp will light. For example, closing switch LS30 produces an input at the upper half or quad gate 86A to effect an output therefrom and energize timer T3. After 0.50 second, the contacts of T3 close to produce an input at gate 88A which is an AND circuit. That is, gates 88A and 88B require an input at the top and an input to the bottom to effect an output. Meanwhile, timer T1 has begun to run, and at time 1.49 an output therefrom triggers gate 87A to actuate the lower half of gate 85A. Since the actuation of the lower half of gate 85A deenergizes 85A which had a plus voltage on its upper half, the output of 85A will be zero before the 1.50 pulse from timer T3 arrives at gate 88A. Hence, 88A would have a zero output when the ram arrives at sampling position so that the "too fast" lamp 40 is out. Similarly, timer T2 would become energized when timer T1 has closed. 0.02 second later at 1.51 seconds, T2 closes to deliver an output and place a signal on the upper half of gate 87B, whereupon the upper half of gate 88B is energized. However, at time 1.50 seconds, the output from timer T3 would have deenergized gate 85B such that the lower half of the AND-gate 88B would have been deenergized before the timer T2 delivered its pulse. Accordingly, if the forward speed of the ram 16 were within limits, i.e., 1.49 to 1.51 seconds, lamp 42 would be deenergized as well.

In the event the ram speed were too fast, LS30 would close and timer T3 would time out before 1.49 seconds, i.e., 1.48, and the pulse from T3 would energize the upper half of 88A before the signal from timer T1 deenergized 85A. Accordingly, the lower half of 88A would be locked in, and lamp 40 would light. In the event that the ram speed were too slow, an output from timer T3 would be effected later than 1.51 seconds. Thus, the output from timer T3 would be too late to deenergize gate 85B so that the AND-gate 88B would be locked in and actuate lamp 42.

Figure 2:
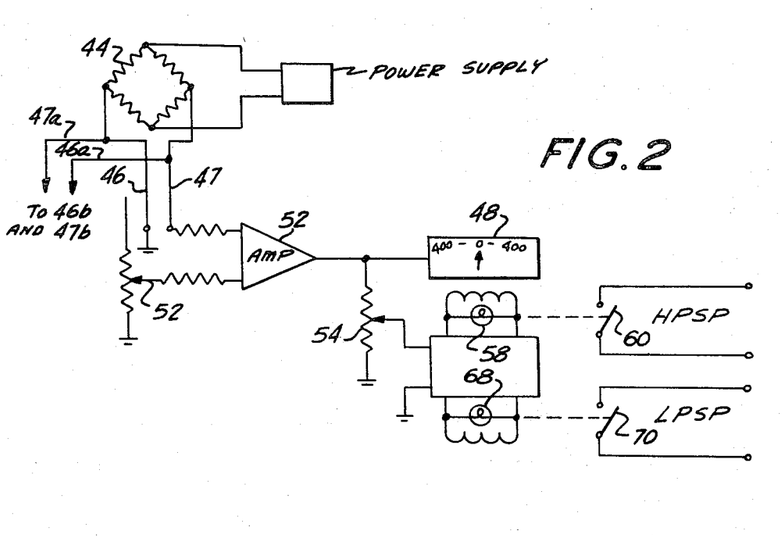
FIG. 2 is an electrical schematic diagram of the pressure set point circuit embodied in this invention.

Referring now to FIGS. 1, 2 and 3A, the melt pressure is picked up by the transducer X (or load cell Y) and an electrical signal developed across bridge 44. The signal across bridge 44 is transmitted over leads 46A and 47A to deviation meter 48 only at the precise point in time when the position switch LS30 closes. Thus, when LS30 closes, gate 86A is energized, no inhibit being imposed thereon since the press open switch 34 is open when the molds are closed. Reed gate 120B is energized and closes its reed contacts whereupon a "hold" is placed on the pressure reading at that point. In addition, reed gate 120A is deenergized since the plus signal on the top of gate 110A is now overcome. Accordingly, the reed contacts of 120A which were previously closed are now opened. The "-hold" voltage on pressure gauge 50 is fed therein from lines 46B and 47B which are in parallel with the lines 46A and 47A from the transducer bridge 44 to the amplifier 53.

The deviation meter 48 has been previously adjusted during set up operations to the zero center of its 400–0–400 range by means of set point potentiometer 52. The high-pressure tolerance set point and the low-pressure tolerance set point are then adjusted by means of pressure band potentiometer 54. Thus, if the viscosity of the melt stream (or in the mold cavity) exceeds the predetermined level, high-pressure set points 60 are tripped from normally open to closed position and red lamp 58 energized. Similarly, if the viscosity falls below the predetermined level, low pressure set point contacts 70 are tripped from normally open to closed position and green lamp 68 is lit. When the high set points 60 are tripped during sample time an increment of heat is thrown into the system, for example, the temperature of the barrel 12 is raised 5° F., and if the low pressure contacts 70 are opened during sample time, a corresponding increment of heat is removed from the system. After a temperature correction has been made, the system is allowed to reach equilibrium before another correction is made. Thus, a predetermined number of injection shots are made after each temperature correction before the next pressure sampling is taken. If the same set point is actuated as on the previous cycle, a second increment of temperature correction is performed, again sampling being inhibited for a predetermined number of shots thereafter to allow the system to stabilize. However, only three temperature corrections in the same direction can be made. If a fourth successive correction is required in the same direction an alarm signal would call the situation to the operator's attention.

With the barrel temperature set by the operator and the zones measured by thermocouples T/C1, T/C2 and T/C3, the respective barrel heaters 13, 14 and 15 are under the control of a suitable temperature controller. The thermocouple control circuit is shown in FIG. 4 with all contacts being shown in their normal position such that all resistances in series with the particular thermocouple, for example T/C1, in the "add heat" circuit are shunted out while all resistances in the "remove heat" circuit are interposed. Contacts CR3, CR4 and CR6 are actuated respectively by reed gates 103, 104 and 105 in the "add heat" solid state control circuit, as shown in FIG. 3B, while contacts CR9, CR10 and CR12 are actuated by the reed gates 111, 112, and 113 in the "remove heat" circuit, as shown in FIG. 3C.

Figure 3B:
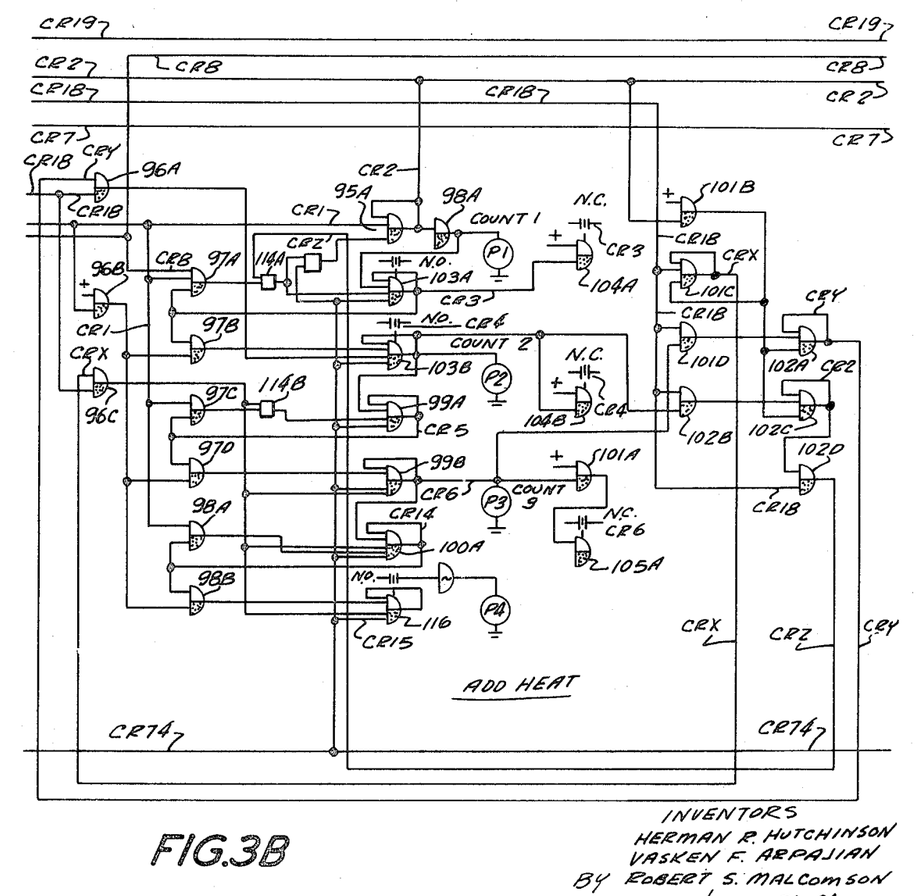
Figure 3C:
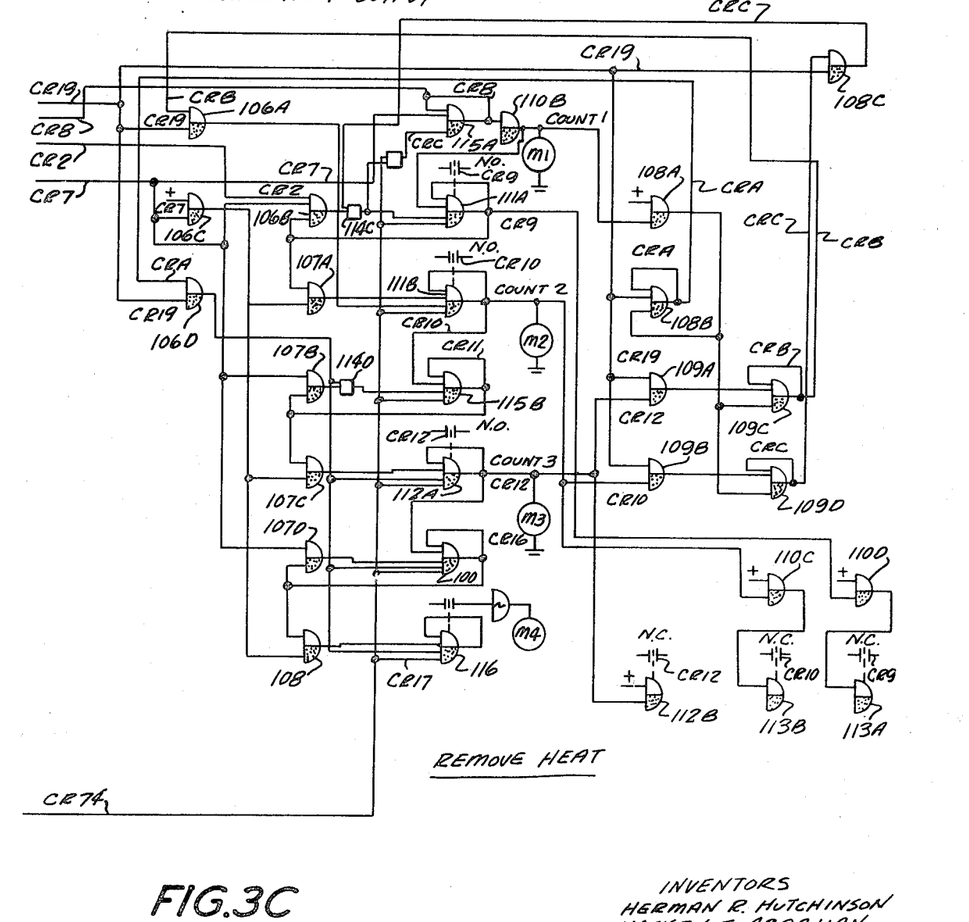

Referring now to FIGS. 3A, 3B, and 3C, if the high-pressure set point contacts 60 are not actuated and the low-pressure set point contacts 70 are not actuated (i.e., pressure and viscosity being in range) neither gate 93A nor gate 93C is energized. Hence, no output appears at CR19 or at CR18. Therefore, neither gate 93B nor gate 93D is tripped so that no signal output is effected on lines CR1 or CR7. Accordingly, a signal is not available to trip the first "add heat" gate 95A which would allow incorporating the first increment of "add heat" (count1) nor for activating any successive "add heat" increments (count 2, count 3, etc.) which are in series therewith. Similarly, a zero signal on line CR7 is ineffectual to trip gate 115A so that neither the first "remove heat" decrement (count 1) nor any of the successive "remove heat" decrements (counts 2 or 3) can function at this stage.

In the event that the high-pressure set points 60 are closed (indicating that the viscosity of the melt stream is too high), gate 93A is energized provided there is no inhibit signal on the bottom quadrant thereof. It is to be observed that an inhibit signal does appear on the lower quadrant of 93A so long as the plus signal appears on the gate 94B and no inhibit appears on the lower quadrant of the latter. It is the deactuation of gate 94B that determines the period of time (300 microseconds) in which the pressure sample is taken and whether a pressure sample can be taken at all for a predetermined number of shots after a correction has been made. Note that gate 94A is actuated and inhibits gate 94B provided there is a "count" input to the upper quadrant of 94A and no inhibit input to the lower quadrant thereof from the plus signal on gate 86B or from the press open limit switch LS34. Since limit switch LS34 is open when the mold is closed, no inhibit from this source is available to either gate 94A or 94B. Since the position microswitch LS30 closes to inhibit gate 86B, 94A can be tripped by a count pulse to deactivate 94B and remove the inhibit to both 93A and 93C. Note also that a count pulse from 95B which actuates 94A and deactivates 94B applies an input to 300-microsecond delay gates 94C, 94D and 86C which deactivates count gate 95B 300 microseconds subsequent to its actuation. The 300-microsecond delay period is the time during which the inhibit is removed from high pressure set point gate 93A and from low pressure set point gate 93C whereupon the pressure sampling can be operative to trip the appropriate "add heat" or "remove heat" circuits. With the high set point gate 93A actuated, line CR19 now carries a signal to deenergize all pertinent gates in the "remove heat" circuit; i.e., 106A, 106D, and 108A. At the same time, gate 93B is actuated and induces an output signal on line CR1 since no inhibit signal from CR8 is imposed on the bottom the AND NOT portion of 93B (i.e., the "remove heat" gate 115A having no signal imposed thereon allows 93B to pass an output). The output signal now appearing on line CR1 energizes the first "add heat" gate 95A provided no inhibit signal appears on the lower quadrant thereof from either line CRZ or from the counter reset line CR74. Since the up-down counter reset switch 74 is not depressed, no signal would appear on line CR74. Furthermore since the plus signal on gate 101B has deactivated 102C, there is no signal passing from 102D to CRZ. Accordingly, gate 95A is energized and becomes locked in this actuated position through its shunt line CR2. At this stage, the output from 95A energizes time delay gate 98A such that the first lamp P1 would light approximately 200 microseconds later. In addition, the OR reed gate 103A would become energized after the 200-microsecond delay period provided there were no inhibit on the AND NOT bottom portion of gate 103A at such time. As has been indicated above, there would be no inhibit signal on the lower half of 103A from the CR74 line so long as the counter reset 74 were not depressed. The other coupling to the inhibit gate of 103A comes from gate expander diode 114A which has two inputs. One possible signal to the expander diode 114A is derived from the CRZ line which is not actuated until a "remove heat" call is made from gate 102D. The other possible signal to the expander diode 114A may come from gate 97A if the latter were actuated by a signal from CR1 or by the now deactivated CR8 line from the "remove heat" circuit. However, it is to be observed that the signal previously on CR1 which initially actuated gate 95A has now been dissipated in view of the 300-microsecond expiration of its "sample" period following the delay exercised by time delay gate 98A. Accordingly, gate 103A can now be energized by the time delayed signal from 95A which is locked in.

Figure 4A:
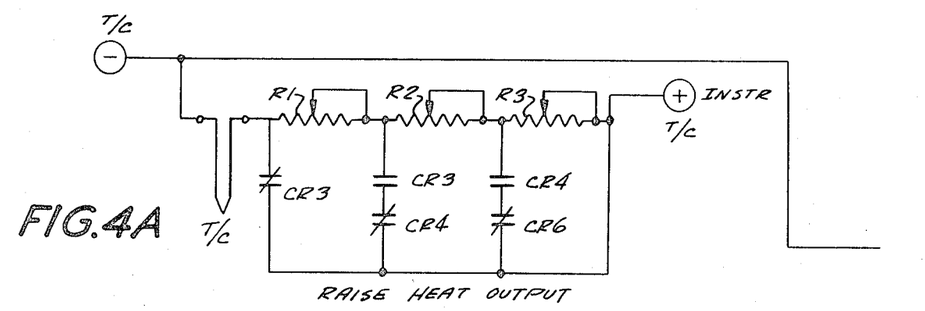
FIG. 4 is an electrical schematic diagram of the temperature control circuitry.
Figure 4B:
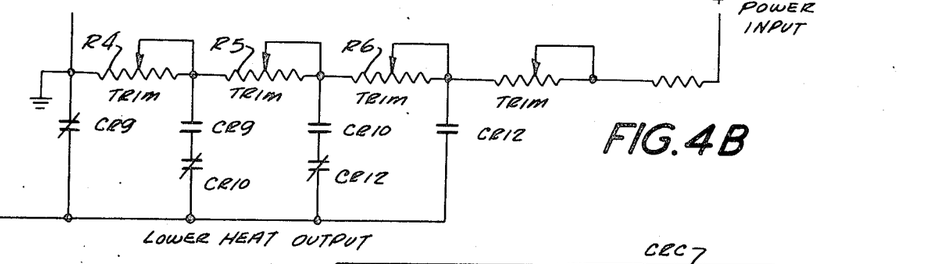

Actuation of gate 103A now causes it to be locked in also in addition to closing its normally open CR3 contacts. At the same time, the output from gate 103A applies an input to the inhibit of gate 104A such that the normally closed CR3 contacts thereof open. Therefore, resistance R1 is added in series with the thermocouple circuit, as shown in FIG. 4A, so that the thermocouple T/C "reads" a lower temperature than the actual temperature conditions. Under such circumstances, the temperature controller asks for more heat to the barrel whereupon the barrel temperature is raised a fixed increment of from between 5° to 10° F.

It is also to be observed that the positive signal output from gate 103A does two things; places an inhibit on its own sentry gate 97A and prevents the latter from passing a subsequent signal from CR1, and places an input to gate 97B. An output would be produced by 97B at this time if there were no signal on its "inhibit." However, the positive signal on the input to gate 96B places an inhibit on 97B because the output signal from 93B has lapsed and will not repeat again until released by the sampling count. Therefore, the reed gate 103B cannot throw a second increment of heat into the system at the same time or immediately following the first heat increment. Hence, the next increment of heat can only be added after a predetermined number of injections have been made as controlled by the sampling switch 75 in order to allow the system to reach equilibrium. When gate 95A in the "add heat" circuit is energized it in turn inhibits 93D through CR2.

Referring now to FIG. 3A, deactivation of the "add heat" and "remove heat" circuits for a predetermined number of shots after a temperature correction has been made is accomplished by setting the sampling counter to the desired number of delay pulses, for example five. The sampling counter carries two banks of microcircuit hysteresis cores which may become actuated when the designated switch 75 contacts are closed and deliver an input to gate 95B after the number of delay pulses called for occur. For example, if switch 75 is set to delay five shots, each of the contacts with the numeral 5 is closed, and five separate closings of the injection forward switch LS32 are required before 95B is actuated. Manual counting can also be effected by depressing pushbutton 76 a corresponding number of times. When gate 95B emits a signal, gate 94A is actuated, no inhibit being on the latter when the mold close switch 34 is open and when the position switch LS30A is tripped open. Note that all intermediate counting pulses from the hysteresis core would have disarmed both gates 94A and 94B. When an output is emitted from 94A, the positive signal on 94B is overcome which removes the inhibit signal imposed on both the high pressure gate 93A and the low pressure gate 93C. The removal of these latter inhibits occurs for approximately 300 microseconds after position switch LS30 closes. That is, the signal emitted by 94A triggers delay gates 94C, 94D and 86C so that an inhibit is placed on the count gate 95B 300 microseconds after the count signal passed. At this time, gate 94A becomes deenergized, and the plus signal on 94B deactivates 93A and 93C until the next proper sampling count is reached.

During the fifth sample count, if the high pressure contacts 60 close during the 300-microseconds sampling interval, gates 93A and 93B once again transmit a signal along CR1. The signal on CR1 first of all removes the inhibit signal placed on the bottom quadrant of 97B by the positive signal imposed on the upper gate of 96B. Now, the previously locked in signal output of gate 95A which also has locked in the reed gate 103A and appears on the upper quadrant of 103B, produces an output therefrom. The normally open CR4 contacts close and at the same time the inhibit signal from 103B placed on gate 98B causes the normally closed CR4 contacts on quad 104B to open. Note that count 2 lamp P2 becomes lit while a second element of resistance R2 is placed in series with the thermocouple, as shown in FIG. 4A.

Meanwhile, the output signal from 103B is applied to the input of 99A. However, at this time, the signal on line CR1 is applied to the IF gate of 97C causing an inhibit signal to be placed on the AND NOT gate of 99A via gate expander diode 114B. Therefore, there is no output from 99A until the signal stops on CR1 whereupon the inhibit on 99A is released. Accordingly, gate 99A is allowed to pass the locked in signal output from 95A, 103A and 103B so that 99A itself becomes locked in. Therefore, its output places an inhibit on the lower quadrant of 97C. Note that the sentry gate 97D for the third increment has an input to its upper quadrant via the output from 99A, but the previously expired inhibit signal from CR1 on gate 96B allows the plus signal from the latter to disarm gate 97D.

As before, the high pressure set points 60 must be actuated during the fifth sampling count thereafter before the inhibit from gate 96B is removed from gate 97D. When this occurs, the output signal locked in from 99A is allowed to pass and energize 99B. The third "add heat" lamp P3 becomes lit, and the inhibit signal applied by the plus voltage upon gate 105A via 101A is discontinued. Accordingly, the normally closed reed contacts CR6 open thereby adding a third increment of resistance R3 in series with the thermocouple circuit. Again, the thermocouples would now "read" less than the actual temperature by the voltage drop across the resistors R1, R2 and R3, as shown in FIG. 4A.

However, it is to be noted that the output signal from 99B although applied to the upper gate of 100A does not actuate the latter because of the signal applied to its sentry gate 98A from CR1 at that time. When the signal from CR1 expires, gate 100A can pass the signal which would then place an inhibit on the bottom of 98A thereby disarming the latter from further inhibit function on gate 100A. In the event that a fourth demand from heat is made during the next sampling period, the inhibit from the plus signal on 96B is removed from the bottom of 98B. Therefore, the locked in signal on 100A passes through 98B and energizes reed gate 116. Energizing the reed gate 116 causes the latter's normally open contacts to close and signal an alarm by ringing a bell and/or illuminating alarm lamp P4.

In the event that the low pressure set point contacts 70 have not opened when the position switch LS30 is tripped and a sampling count is permitted, a pulse will appear on the top quadrant of 93C. A signal output now appears on line CR18 and at gate 93D which is actuated causing a signal to appear on line CR7. If there have been "add heat" increments already incorporated at such time (as a result of prior tripping of the high-pressure set points), these are removed first. Thus, the branch of CR18 going to 101C, 101D and 102B places an input on each of them and at the same time places an inhibit on 102D. Note that there would be no signal on line CR7 because of the inhibit of CR2 at 93D. Note that at this time, there would be no inhibit placed on gates 102A, 102C or 101C because the locked in signal on the first "add heat" count would have deactivated the plus signal on 101B. Therefore, 101C (CRX), 102A (CRY), and 102C (CRZ) could pass signals if they were activated at their respective inputs. If there were three add increments of heat on, an inhibit would be placed on 101D from energized 99B, an inhibit would be placed on 102B from actuated reed gate 103B, but 101C would trigger to lock in line CRX. The CRX line would place a signal on 96C and actuate the latter as soon as the inhibit pulse from CR18 were dissipated. Now, the output of 96C passes through the expander 114B and places an inhibit on 99A. The previously locked in output signal from 99A is thereby cut off so as to deenergize 97D. Accordingly, 99B is deenergized opening the CR6 contacts so that the count 3 "add heat" increment is now removed. In addition, the inhibit is removed from 101D.

If there were two "add heat" increments incorporated when the low-pressure set points 70 were closed during sampling time, there would be no inhibit pulse placed on 101D. Accordingly, the output on 101D from CR18 would actuate 102A and lock the latter in via its CRY shunt. The locked in signal on CRY would actuate 96A as soon as the CR18 pulse dissipates. The output of 96A would place an inhibit on 103B and reverse both the previously closed contacts CR4 thereof as well as the previously opened CR4 contacts of 104B. Accordingly, resistances R2 as well as R3 would be removed from the thermocouple circuit. In addition, the inhibit previously placed on 102B by the output from 103B is removed.

If there were only a single "add heat" increment in the circuit during a low-pressure signal interval, the inhibit on gate 102B would be removed and the CR18 pulse thereon would apply an input to 102C. Since there would be no inhibit on 102C at this time, an output signal would lock in 102C and place a signal on 102D. As soon as the CR18 inhibit on 102D ceases, an output would appear on line CRZ. Now, an inhibit would be imposed on 95A whereby the output therefrom would cease. In addition, the branch of the CRZ line going to gate expander diode 114A would place an inhibit signal on the bottom of the gate 103A so that the output therefrom would also cease. Therefore, the reed contacts of 103A and 104A would reverse and eliminate the series resistance R1 from the thermocouple circuit.

With no "add heat" increments included, the CR2 line over to the "remove heat" circuit would not carry a signal. Accordingly, gate 106B would not be imposing an inhibit on gate 111A or 115A, thereby permitting the latter gates to become actuated. Now the next signal on the CR7 line from the untripped low pressure contacts 70 would apply an input signal to the first "remove heat" gate 115A. Note that at this stage, there would be no inhibit signal on gate 115A from either the CR74 line nor from the CRC line or CR2. The output pulse from 115A triggers delay gate 110B and after approximately 200 microseconds the output of 110B lights lamp M1 and applies a signal to 111A. Now there is an input to gate 111A which will energize that gate as soon as the inhibit signal thereon is removed. Meanwhile the gate 115A became locked in via shunt CR8, and the "low pressure" signal appearing on CR7 would have been applied to the input of gate 106B so as to place an inhibit on 111A through gate expander diode 114C. However, when the sampling period has expired, CR7 loses its signal and the corresponding inhibit on gate 111A so that the signal from 110B thereon energizes gate 111A to close its normally open CR9 contacts and open the normally closed CR9 contacts on reed gate 113A. Resistance R4 is removed from the thermocouple circuit so that the temperature read by the thermocouple is greater than the actual temperature. In addition, gate 111A becomes locked in and applies an inhibit signal to its sentry gate 106B to prevent further actuation of the latter. Moreover, the output signal from 111A is applied to the input of 107A, the latter now having an inhibit pulse thereon from the plus voltage on 106C since the CR7 signal is off at this state—when gate 115A was energized in inhibited gate 93B through CR8.

When the next low-pressure signal is received from the low-pressure contacts 70, it being necessary for the latter to be closed during the next sampling period, the signal on CR7 cancels the output from 106C. As soon as the inhibit pulse is lost on 107A, the voltage from 111A on the input gate of 107A passes therethrough and energizes the second "remove heat" gate 111B. Lamp M2 becomes lit, the normally open CR10 contacts on 111B close, and the normally closed CR10 contacts open. Resistance R5 is removed from the thermocouple circuit at this time.

The output voltage from 111B is applied to 115B, the output of which applies an inhibit to its sentry gate 107B only when 115B passes a signal. Note that the voltage on the CR7 line applies an input to 107B with a consequent inhibit on 115B. When the CR7 signal ceases, the output of 115B is applied to 107C which has an inhibit applied thereto from the plus voltage on 106C. Therefore, the third "remove heat" decrement cannot be applied to 112A until the next sampling period indicates a low pressure signal.

A third successive "remove heat" signal applied to the low-pressure contacts 70 would actuate gate 112A causing its normally open CR12 contacts to close and the normally closed CR12 contacts on 112B to open. Lamp M3 is illuminated and resistance R6 is removed from the thermocouple circuit. If after a predetermined number of shots (nominally five) produces a fourth call for "remove heat," gate 116 would be actuated via quad 108 and close the reed contact on gate 116. An alarm would then be signaled to lamp M4, calling the operator's attention to the problem.

In the event that a sampling period would call for an "add heat" increment during the time that any one of the three "remove heat" counts were applied, the "remove heat" counts would be cancelled from the circuit first. For example, if all three "remove heat" counts were in the circuit, gates 108A, 109A and 109B would respectively carry inhibit signals from the count 1, count 2 and count 3 "remove heat" circuits via 110B, 111B and 112A. Therefore, an "add heat" signal appearing on line CR19 would only actuate gate 108B, the inhibit signal from 108A being cancelled by the output from 110B. The signal on line CRA locks in 108B and then applies itself to 106D, the latter having the CR19 inhibit thereon temporarily. When the "add heat" signal on line CR19 is dissipated, gate 115B becomes deenergized through gate expander 114D and gate 112A simultaneously deenergized to reverse the CR12 contacts thereon and on 112B. Resistance R6 is added to the thermocouple circuit. In addition the inhibit on gate 109A is removed.

A call for "add heat" while two "remove heat" counts are incorporated allows the signal on CR19 line to pass through gate 109A. The output on gate 109A energizes and locks in gate 109C so that an output signal appears on line CRB. When the CR19 signal has expired, the CRB pulse passes through gate 106A and applies an inhibit to 111B. Deenergizing 111B reverses its CR10 contacts and the CR10 contacts on 113B. Thus, the second resistance R5 in the "remove heat" thermocouple circuit is added back. Finally the inhibit on 109B imposed by the output of 111B is also removed.

When a demand for "add heat" is signaled at a time when only a single count of "remove heat" is included, the signal from CR19 actuates gate 109B and thereafter gate 109D which becomes locked in. The output from 109D is applied to 108C which transmits an output upon expiration of the CR19 signal. The pulse on line CRC is applied to the inhibit gate of 115A and to 111A via expander 114C. Thus, the 111A signal is extinguished causing its CR9 contacts to reverse and add resistance R4 to the thermocouple circuit. Note also that the CR8 line no longer has a pulse to extinguish lamp M1. The "add heat" circuit can now function as hereinbefore described.

It is to be observed that the foregoing illustrations all relate to the raising or lowering of the heat output to the material being plasticized depending upon whether the melt stream indicated a viscosity greater or less than the limits set up during startup operations. Although the specification indicated that the temperature of the barrel was to be raised or lowered in fixed increments by a temperature controller via thermocouples T/C, it is apparent that the viscosity of the melt can be compensated by other means. For example, instead of the resistances R1 to R6 being operative to adjust the thermocouple readings, the same resistance circuit could be utilized to increase or decrease the speed of rotation of the screw 16 during plasticization rather than throw a greater amount or lesser amount of heat into the barrel 12 through the heating elements 13, 14, and 15. Note that a greater degree of rotation would add heat to the system. In addition to the heat input control by way of temperature variation or screw rotation, heat input to the melt stream can also be accommodated by varying the degree of back pressure on the screw 16 during plasticization. By incorporating the resistances R1 to R6, or any pickoff signal generated by the control system into the hydraulic system, to increase or decrease the degree of back pressure exerted by the ram 16 during plasticization, the same effective control of heat output to the melt can be obtained proportional to the viscosity thereof.

Still another mode of controlling the shot being injected as contemplated by the present invention would be to detect increase or decrease in the speed of the ram and depending upon whether the monitored speed were higher or lower than the prescribed limits to decrease or increase melt temperature, in order to reestablish the desired viscosity. Again, the decrease or increase in melt temperature can be achieved (1) by lowering or raising the barrel temperature, (2) by decreasing or increasing the rotational speed of the screw, or (3) by decreasing or increasing the back pressure thereon during generation of the next shot.

Figure 5:
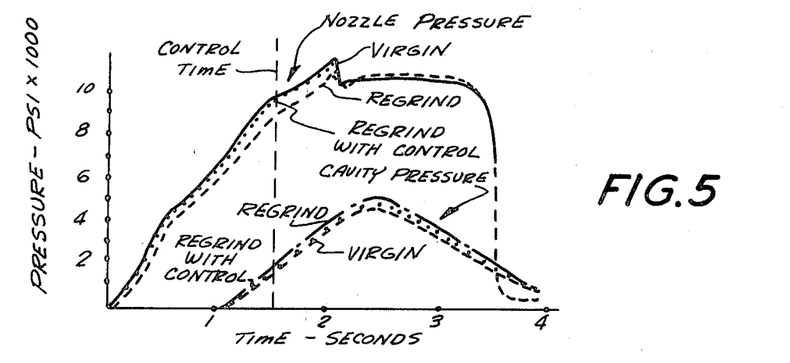
FIG. 5 is a typical pressure versus time curve for thermoplastic material.

Referring now to FIG. 5 there is shown typical pressure versus time curves for a thermoplastic material. The solid line curve represents the pressure read at the nozzle by the transducer X during the injection stroke while the broken line represents the cavity pressure measured by the transducer Y. As the ram 16 starts its forward stroke, the pressure recorded in the melt stream by transducer X begins at zero and moves upwardly rapidly along a primary curvilinear path until a first slight change of slope occurs in approximately 1 second. This first plateau represents a pressure transition as the gate breaks through. Thereafter, the pressure rises rapidly again until a second plateau is reached. The second plateau represents an equilibrium pressure and is a desirable point at which to monitor the control pressure. Next, the pressure curve rises rapidly to a peak at which point the first stage hydraulic pressure is released. The cutoff high-pressure peak occurs immediately before the material would overfill the mold and "Flash." As a matter of good molding practice, it is desirable to reach the cut off point as quickly as possible. The downward slope of the pressure curve is intended to reach a holding pressure, but a slight undershoot occurs because the hydraulic relief valve does not respond quickly enough. The pressure then rises to a relatively constant plateau at which point the gate freezes. Hydraulic pressure is then released preparatory for the next cycle. The solid line measuring the melt stream pressure is shown for virgin feed stock and at the control pressure demonstrates the set up position. The dashed line spaced below shows a typical melt stream pressure curve for regrind material without the controller. The dotted line demonstrates the very same regrind stock being injected with its viscosity corrected by the process control system.

The cavity pressure as measured by the transducer starts to build up immediately before the second plateau of the nozzle pressure and peaks at approximately 2½ seconds as the nozzle pressure is at the midpoint of its hold pressure. As can be seen, cavity pressure of regrind material follows that of virgin material when pressure in the nozzle has been returned to within its prescribed control limits. Similarly, it has been determined that cavity pressure can be maintained for varying ambient and mold temperature conditions using the controller to maintain the control pressure within prescribed limits. Thus, molds can be filled at the same rate and at the same pressures regardless of the aforementioned varying conditions by controlling viscosity at the control point.

Figure 6:
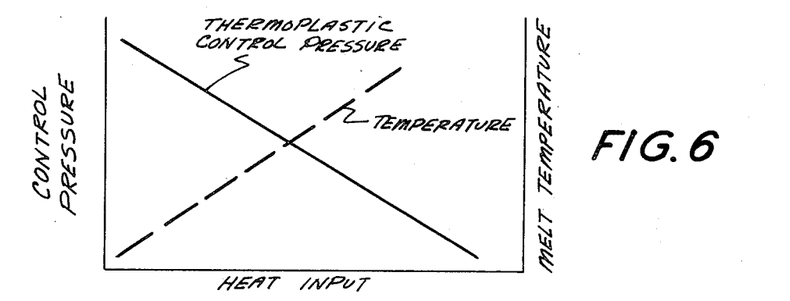
FIG. 6 is a typical pressure (viscosity) versus barrel heat curve for thermoplastic material.

In FIG. 6, it is demonstrated that the viscosity (pressure) curve for a thermoplastic material is substantially inversely proportional to the heat input to the material being plasticized. Hence, increments of heat are added when the pressure is increased and removed when the pressure is decreased.

Figure 7:
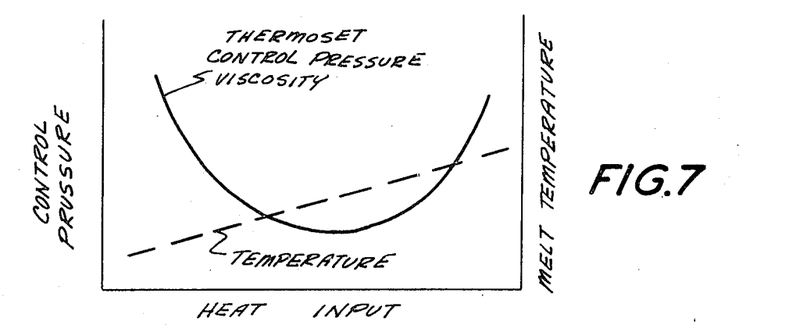
FIG. 7 is a typical pressure (viscosity) versus heat input curve for thermoset material.

In FIG. 7, the viscosity (control pressure)-heat input curve is shown for thermosetting materials. Thus, the control pressure curve for thermosetting material is upwardly concave wherein a higher pressure is evidenced with relatively low heat input. The pressure drops off to a minimum with increasing heat input and then rises again with still further heat input. That is, there is a pressure rise with thermoset material going toward a granular state (insufficient heat input) and also a rise in pressure as the material is moving toward a cured state. Again the horizontal coordinate (heat input) represents any combination of barrel temperature, back pressure on the screw and screw speed. In the ideal thermoset cycle, the zone of the pressure curve where operation is most efficient is somewhere to the right of the nadir point but less than the cure point. The reason for selecting the rise zone is that most injection molding grades of thermoset material have fairly long gel times such that the curve tends to be substantially flat. Therefore, the shortest cure time is obtained by operating somewhere on the upward slope so that the material temperature is as high as possible without detracting from finished part quality.

If an injection molding machine is run at a control pressure to the left of the low-pressure point, it is obvious therefore that cycle time would be extended as cure time would be overly long to produce a quality part.

Accordingly, with the process control described hereinbefore using the nozzle pressure transducer X, the operator determines whether he is operating on the left or right side of the curve by observing the effect of increased heat input to the thermoset material. If a slight upward change in barrel temperature produces a lowered pressure, the zone of operation is to the left. Accordingly, an appreciable increase in barrel temperature, screw speed or back pressure must be made to bring the operation cycle at optimum condition when an increase in heat produces a rise in temperature. The same control technique but inverse in response may be applied to thermoset material as was applied to thermoplastic material.

It is therefore apparent that the instant invention resides in the measurement of the relative viscosity of the plastic material in the melt stream from cycle to cycle and to compensate for variations in such viscosity by the degree of heat input to the material being plasticized. For this manner, if the mold is filled in the same period of time and at the same pressure from shot to shot, repeatability is obtained in the quality of finished parts regardless of minor changes in variables.

Although this invention has been described in considerable detail, such description is intended as being illustrative rather than limiting, since the invention may be variously embodied, and the scope of the invention is to be determined as claimed.

We claim:

1. Automatic control apparatus for a molding machine having a ram for injecting hot plasticized material into a mold comprising:
   means for heating the plasticized material prior to injection into the mold,
   measuring means in the melt stream for monitoring the viscosity characteristics of the plasticized material in each shot being injected during the forward stroke of the ram at the time of flow of the material into the mold, and
   first actuating means responsive to said measuring means when the viscosity of the melt stream exceeds a predetermined level and operatively associated with said means for heating to increase the temperature of the melt stream in subsequent shots, and second actuating means responsive to said measuring means when the viscosity falls below a predetermined level and operatively associated with said means for heating to decrease the temperature of the melt stream in subsequent shots.

2. The invention of claim 1 wherein said means for monitoring comprises a transducer which measures pressure as a function of viscosity.

3. The invention of claim 1 wherein the respective increase and decrease in temperature of the melt stream is effected in predetermined increments.

4. The invention of claim 1 wherein the respective increase and decrease in temperature of the melt stream is effected by respectively raising and lowering the temperature of said means for heating during generation of subsequent shots.

5. The invention of claim 1 wherein said ram constitutes a rotatable screw, and the respective increase and decrease in temperature of the melt stream is effected by respectively increasing and decreasing the speed of screw rotation during generation of subsequent shots.

6. The invention of claim 1 wherein said ram is hydraulically operated and comprises a rotatable screw, and the respective increase and decrease in temperature of the melt stream is effected by respectively increasing and decreasing the hydraulic back pressure on said screw during generation of subsequent shots.

7. The invention of claim 2 wherein said molding machine is an injection-type apparatus having a nozzle and said transducer is located in the nozzle.

8. The invention of claim 1 including means to disarm each of said actuating means a predetermined number of injection shots after temperature correction has been made whereby the viscosity level may be allowed to reach equilibrium.

9. The invention of claim 8 wherein the first and second actuating means are adapted to be reactivated respectively after a predetermined number of injection shots have been made.

10. The invention of claim 8 wherein each of said actuating means is adapted to be activated for at least two temperature increments in the same direction.

11. The invention of claim 10 including an alarm which is energized after a predetermined number of successive temperature corrections have been made in the same direction.

12. Automatic control apparatus for a molding machine having a ram for injecting hot plasticized material into a mold comprising:
   means for heating the plasticized material prior to injection into the mold,
   measuring means for monitoring the viscosity characteristics of the plasticized material in the melt stream during a predetermined portion of the forward stroke of the ram at the time a shot is being injected and material flows into the mold, and
   first and second actuating means responsive to said measuring means and respectively activated when the viscosity exceeds and falls below a predetermined level, said first actuating means operating said means for heating to increase the temperature of the melt stream in subsequent shots and said second actuating means operating said means for heating to decrease the temperature of the melt stream in subsequent shots.

13. The invention of claim 12 wherein said means for monitoring measures pressure as a function of viscosity.

14. The invention of claim 12 wherein the respective increase and decrease in temperature of the melt stream is effected in predetermined increments.

15. The invention of claim 12 wherein the respective increase and decrease in temperature of the melt stream is effected by respectively raising and lowering the temperature of said means for heating during generation of subsequent shots.

16. The invention of claim 12 wherein said ram constitutes a rotatable screw, and the respective increase and decrease in temperature of the melt stream is effected by respectively increasing and decreasing the speed of screw rotation during generation of subsequent shots.

17. The invention of claim 12 wherein said ram is hydraulically operated and comprises a rotatable screw, and the respective increase and decrease in temperature of the melt stream is effected by respectively increasing and decreasing the hydraulic back pressure on said screw during generation of subsequent shots.

18. Automatic control apparatus for an injection molding machine comprising:
   means for injecting plasticized material into a mold,
   means for heating the plasticized material prior to injection into the mold,
   measuring means in the melt stream for monitoring the viscosity characteristics of the plasticized material at the time a shot is being injected and material flows into the mold, and
   actuating means activated by said measuring means when the viscosity of the melt stream is outside a predetermined band, said actuating means operating said means for heating to increase the temperature of the melt stream in subsequent shots when the monitored viscosity is above the band range, and said actuating means operating upon said means for heating to decrease the temperature of the melt stream in subsequent shots when the monitored viscosity is below the band range.

19. The apparatus of claim 18 wherein said actuating means includes high-level set points triggered at the upper end of the band and low-level set points at the bottom end of the band.

20. The apparatus of claim 19 wherein said high-level set points control an electronic circuit for raising the temperature of said means for heating and said low-level set points control an electronic circuit for lowering the temperature of said means for heating.

21. The apparatus of claim 18 wherein said means for injecting comprises a reciprocable ram, said measuring means being tripped at a predetermined position of the ram during the advancement thereof.

* * * * *